United States Patent [19]

Calbo et al.

[11] Patent Number: 5,187,019

[45] Date of Patent: Feb. 16, 1993

[54] LATENT CATALYSTS

[75] Inventors: Leonard J. Calbo, Bethel; Robert D. Coughlin, Fairfield, both of Conn.

[73] Assignee: King Industries, Inc., Norwalk, Conn.

[21] Appl. No.: 755,799

[22] Filed: Sep. 6, 1991

[51] Int. Cl.$^5$ ................................ C08L 31/00
[52] U.S. Cl. ...................... 428/524; 528/230; 528/232; 528/246; 528/249; 528/265; 528/266; 525/398; 525/401; 525/414; 525/437; 525/441; 524/158; 524/160; 428/528
[58] Field of Search ............ 528/230, 232, 246, 249, 528/265, 266; 525/398, 401, 414, 437, 441; 524/158, 160; 428/524, 528

[56] References Cited

U.S. PATENT DOCUMENTS

| | | | |
|---|---|---|---|
| 2,222,506 | 11/1940 | Hodgins et al. | 528/261 |
| 2,226,518 | 12/1940 | Hodgins et al. | 526/60 |
| 2,227,223 | 12/1940 | Hodgins et al. | 526/60 |
| 2,322,979 | 6/1943 | Siegel | 526/71 |
| 2,323,357 | 7/1943 | Rosenbaum | 524/765 |
| 2,326,265 | 8/1943 | Tawney | 526/71 |
| 2,327,984 | 8/1943 | West | 528/232 |
| 2,350,894 | 6/1944 | Honel | 528/261 |
| 2,631,138 | 3/1953 | Dannenberg | 525/511 |
| 2,764,548 | 9/1956 | King et al. | 252/33 |
| 3,265,645 | 8/1966 | Coney et al. | 210/15 |
| 3,267,174 | 8/1966 | Fry et al. | 525/163 |
| 3,293,324 | 12/1966 | Tropp et al. | 525/437 |
| 3,310,416 | 3/1967 | Schibler | 106/285 |
| 3,474,054 | 10/1969 | White | 427/385.5 |
| 3,804,920 | 4/1974 | Cunningham et al. | 525/443 |
| 3,957,859 | 5/1976 | Thielcke | 562/90 |
| 3,960,688 | 6/1976 | Calbo | 204/181 |
| 3,979,478 | 9/1976 | Gallacher | 525/163 |
| 4,075,176 | 2/1978 | Gallacher | 528/254 |
| 4,200,729 | 4/1980 | Calbo | 525/398 |
| 4,251,665 | 2/1981 | Calbo | 548/215 |
| 4,396,672 | 8/1983 | Adesko | 428/323 |
| 4,396,680 | 8/1983 | Chang | 428/421 |
| 4,397,989 | 8/1983 | Adesko | 525/162 |
| 4,632,964 | 12/1986 | Altschuler et al. | 525/456 |
| 4,812,506 | 3/1989 | Gilmer et al. | 524/512 |

FOREIGN PATENT DOCUMENTS 769958  3/1957  United Kingdom .

OTHER PUBLICATIONS

Chemical Reviews, E. D. Bergmann, vol. 53, pp. 309-352 (1953).

Primary Examiner—John Kight, III
Assistant Examiner—Sam A. Acquah
Attorney, Agent, or Firm—Morgan & Finnegan

[57] ABSTRACT

Amino resins, e.g., urea-formaldehyde and melamine-formaldehyde thermosetting resins, are cured with a latent catalyst which is a thermally-decomposable adduct of an aromatic sulfonic acid (e.g., p-toluene sulfonic acid) and a bicyclic oxazolidines (e.g., 1-aza-3,7-dioxa-5-ethylbicyclo (3.3.0) octane. The coating compositions can contain other conventional co-reactants, such as polyols, polyacids, alkyd resins, polyester resins, epoxies, acrylics and the like. Coatings containing the amino resin, co-reactant, and latent catalyst have an acceptable viscosity stability, cure rapidly at temperatures lower than some other latent catalysts, and produce films with no wrinkles.

27 Claims, No Drawings

LATENT CATALYSTS

This invention relates to improved latent catalysts for curing amino resins. More particularly, it relates to adducts of aromatic sulfonic acids for curing coating compositions containing amino resins and other components. Still more particularly, it relates to bicyclic oxazolidine adducts of aromatic sulfonic acids for curing urea-formaldehyde, melamine-formaldehyde, and similar thermosetting resin systems.

BACKGROUND OF THE INVENTION

Heat-curable products obtained by reacting compounds containing amine or imine groups (e.g., ureas, amides, aminotriazines, and the like) with aldehydes (e.g., formaldehyde, glyoxal, benzaldehyde, and the like) have been known for a number of years. Resins obtained by curing such condensation products possess an excellent combination of physical properties and are widely used in glues and molding compounds, as finishes for paper and textiles, and as surface coatings. The curable resins can be used per se or they can be further modified before curing, e.g., by alkylation with an alcohol such as methanol or butanol to provide solubility and compatibility and/or by admixture with other co-reactive materials such as polyfunctional compounds containing hydroxyl groups or carboxyl groups (e.g., glycols, alkyd resins, polyester resins, and the like). Broadly, the present invention is concerned with amino resins which are suitable for all conventional purposes. However, in its most preferred aspects, it is concerned with soluble forms or liquid forms of such amino resins, which are well known to be superior as coatings for metals and coatings or impregnants for cloth, paper, and the like. Such curable resins commonly comprise urea- or melamine-aldehyde condensation products or the reaction products thereof with alcohols (e.g., methylol ureas or methylol melamines) and alkylated derivatives thereof (e.g., methylated or butylated derivatives) either alone or dissolved in a suitable solvent. These specific amino resins are coated onto three-dimensional substrates (e.g., metal, glass, wood, plastics, and the like) and then heat-cured. The curing mechanism is condensation and crosslinking to split out water, alcohol, or formaldehyde. Curing can be effected without a catalyst if the resins are heated for a long enough time, i.e., for hours or days. However, for immediate curing or for curing at more moderate temperatures, an acid is often added to function as a crosslinking catalyst. The acidic catalysts previously used with amino resins include boric acid, phosphoric acids, acid sulfates, sulfonic acids and sulfonyl halides, hydrochlorides, ammonium phosphates and polyphosphates, acid salts of hexamethylene tetramine, phthalic acid, oxalic acid, and the like.

L. V. Gallagher U.S. Pat. No. 3,979,478 issued Sep. 7, 1976 discloses that high molecular weight polyalkylaromatic polysulfonic acids (e.g., dinonylnaphthalene disulfonic acid) are superior catalysts for curing amino resin systems. These acid catalysts cure the resins in short periods of time and produce products having superior physical properties. These acid catalysts can be stored in the form of thermally-decomposable adducts to provide greater shelf life.

M. M. White U.S. Pat. No. 3,474,054 issued Oct. 21, 1979 teaches that amine salts of aromatic sulfonic acids, preferably tertiary amine salts (e.g., pyridine salt of p-toluene sulfonic acid), can be utilized to cure amino resin coating compositions.

F. E. Tropp et al. U.S. Pat. No. 3,293,324 issued Dec. 20, 1966 discloses that the 2-dimethylamino-2-methyl-1-propanol salt of p-toluene sulfonic acid can also be utilized to cure thermosetting aminoplast resins.

L. J. Calbo U.S. Pat. No. 4,200,729 issued Apr. 27, 1980 and U.S. Pat. No. 4,251,665 issued Feb. 17, 1981 disclose particular adducts which impart outstanding resistance properties to the cured resins. Aromatic sulfonic acids in association with oxa-azacyclopentanes (e.g., 4,4-dimethyl-1-oxa-3-aza-cyclopentane) are outstanding latent catalysts for curing amino resin compositions. Compositions containing the latent catalysts have exceptional package stability and can be stored ready for use for relatively long periods of time without significantly detracting from the composition's usefulness. It is believed these advantageous results are attributable to a unique combination of the high volatility of the amine component and the low dissociation constant incident to the oxa-azacylopentane adducts. This combination, in addition to other factors, may provide for a particularly effective association of the adduct with the resin during the curing process and result in fast curing times and cured resins having superior properties. The cured resins have superior properties, particularly water resistance, compared to resins cured with unneutralized aromatic sulfonic acids and to other amine adducts of the aromatic sulfonic acids.

SUMMARY OF THE INVENTION

It has now been unexpectedly discovered that while the above oxa-azacyclopentane adducts may be useful for curing amino resin compositions, there are selected new amine adducts based on a bicyclic oxazolidine which offer faster cure times at lower temperatures despite the higher boiling point of the amine blocking agent.

The present invention provides a latent catalyst which is a thermally-decomposable adduct of an aromatic sulfonic acid and a bicyclic oxazolidine which has the general formula:

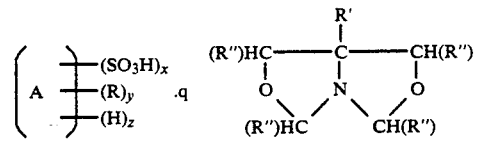

wherein A is phenyl or naphthyl; x is 1 to 8, y is 0 or a whole number of from 1 to the total number of available hydrogens on said phenyl or naphthyl rings; the sum of x and y is no greater than 8; z is $8-x-y$ when A is naphthyl and $6-x-y$ when A is phenyl; q is equal or greater than about 0.5; R is an alkyl, halogen, haloalkyl, or alkoxy group and preferably R is an alkyl or alkoxy group; R' is a straight or branched organic group such as an alkyl or hydroxy alkyl group, preferably a $C_1$-$C_6$ alkyl or hydroxyalkyl group (e.g., an ethyl or hydroxy methyl group); and R" is hydrogen or a $C_1$-$C_6$ alkyl group (e.g., a methyl or isopropyl group); and preferably R" is hydrogen. The preferred sulfonic acid is p-toluene sulfonic acid. The preferred bicyclic oxazolidine is 1-aza-3,7-dioxa-5-ethylbicyclo (3.3.0) octane.

The present invention also provides a composition comprising a heat-curable amino resin, a catalytically effective amount of the above-described thermally-decomposable adduct, and optionally but preferably co-reactants such as polyesters or polyacrylics.

DESCRIPTION OF THE PREFERRED EMBODIMENTS

Aromatic sulfonic acids useful in the adduct can vary widely in chemical nature. They can contain one or more aromatic rings (e.g., benzene or naphthalene rings) and one or more sulfonic acid groups. When the acid has a single aromatic ring, the acid is an alkyl-benzene sulfonic acid and the alkyl groups can be positioned on the aromatic ring in the ortho, meta, or para position. Suitable alkyl-benzene sulfonic acids include p-decyl benzene sulfonic acid, p-dodecyl benzene sulfonic acid, and the like. The preferred alkyl-benzene sulfonic acid is p-toluene sulfonic acid. When the acids contain a naphthalene ring, the substituents may be in any position and mixed positional isomers are also included. The naphthalenic acids can have one or more sulfonic acid groups as well as straight or branched alkyl groups. Suitable naphthalenic sulfonic acids include dihexyl naphthalene disulfonic acid, diheptyl naphthalene disulfonic acid, dihexyl naphthalene sulfonic acid, and the like. The preferred naphthalenic sulfonic acids are dinonylnaphthalene disulfonic acid and dinonylnaphthalene (mono)sulfonic acid.

The alkyl-substituted naphthalene polysulfonic acids are described in U.S. Pat. No. 3,979,478, the disclosure of which is incorporated herein by reference. These acids have at least two straight or branched alkyl groups and two sulfonic acid groups on the naphthalenic nucleus. They have a molecular weight of at least about 500. Best results are obtained with maximum variations in substituent locations and maximum branching. These acids can be prepared, for example, by sulfonating polyalkylnaphthalenes. The polyalkylnaphthalenes can be made by alkylating naphthalene with olefins or alkyl halides in the presence of a suitable catalyst (e.g., hydrogen fluoride or anhydrous aluminum chloride) and a suitable solvent (e.g., naphtha, sulfur dioxide, nitrobenzene or a mixture of benzene and nitrobenzene). See Robert G. King and George W. Thielcke U.S. Pat. No. 2,764,548 issued Sep. 25, 1956 and also assigned to the assignee of the present invention. If a branched olefin is used (e.g., propylene trimer or propylene tetramer obtained by polymerizing propylene with an acid catalyst such as phosphoric acid), then the alkyl groups will be highly branched. Sulfonation is accomplished by treating the polyalkylaromatic compound with a sulfonating agent. For example, the dialkylaromatic compound is dissolved in an inert solvent (e.g., petroleum naphtha, hexane, heptane, octane, a chlorinated solvent or the like) and sulfuric acid, preferably oleum, is introduced into the solution at the desired temperature with agitation. After the reaction is complete, the sulfonic acids are recovered by extraction with water and the polysulfonic acid is recovered from the aqueous extract by extraction with a water immiscible solvent (e.g., pentanol, hexanol, heptanol, octanol, decanol, and the like). A detailed technique for preparing dinonylnaphthalene disulfonic acid, didodecylnaphthalene disulfonic acid and isomers and analogs thereof is described in the '548 patent. A preferred isolation procedure is described in Thielcke U.S. Pat. No. 3,957,859 issued May 18, 1976, the disclosure of which is incorporated herein by reference.

Suitable bicyclic oxazolidines have the formula

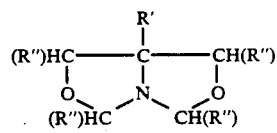

where R' is a straight or branched organic group such as an alkyl group or hydroxy alkyl group, preferably a $C_1$-$C_6$ alkyl or hydroxyalkyl group and most preferably an ethyl group or hydroxy methyl group, and where R" is hydrogen or a $C_1$-$C_6$ alkyl group (e.g., a methyl or isopropyl group) and preferably R" is hydrogen. The preferred bicyclic oxazolidine is 1-aza-3,7-dioxa-5-ethylbicyclo (3.3.0) octane. A review of oxazolidine chemistry is found in the publication Chemical Reviews, E. D. Bergmann, Vol. 53, pp. 309–352 (1953), the disclosure of which is incorporated herein by reference.

As discussed above, the latent catalysts of the present invention are adducts of an aromatic sulfonic acid and a bicyclic oxazolidine. The acid and oxazolidine can form the adducts at varying molar ratios which will depend on the particular compounds employed and their properties. For example, the molar ratio of aromatic sulfonic acid to bicyclic oxazolidines can range from about 0.5 to about 1.5. The most preferred molar ratio is about 1.0.

The preferred adduct is an adduct of p-toluene sulfonic acid and 1-aza-3,7-dioxa-5-ethylbicyclo (3.3.0) octane. It is soluble in water; alcohols such as methanol, isopropanol, n-butanol, butyl cellosolve, and the like; acetates such as n-butyl acetate, 2-methoxypropyl acetate, and the like; ketones such as methyl ethyl ketone, methyl amyl ketone, methyl iso-butyl ketone; and xylene. It is insoluble in mineral spirits and only slightly soluble in high boiling aromatic hydrocarbons.

Procedures for preparing the adducts are known to those skilled in the art. They involve treating the aromatic sulfonic acid with the bicyclic oxazolidine to effect neutralization of the acid. The acid can be used per se or it can be diluted in a solvent such as methanol or the solvents discussed above. The bicyclic oxazolidine is added to the acid or acid solution in an amount sufficient to raise the pH of the final catalyst solution to about 2 to 4. The preferred pH is 2.5 to 3.5.

The amino resin component generally comprises an amine- or imine-containing compound condensed with an aldehyde, a dialdehyde, or an aldehyde precursor. In particular, a urea-formaldehyde condensate or a triazine-formaldehyde condensate (e.g., melamine-formaldehyde condensate) can be used. Some of these condensates are soluble in organic solvents can be converted to solvent-soluble derivatives (e.g., ether derivatives).

Amino resin condensates particularly suited for use in the present invention include those generally described as aklylated-urea-formaldehyde condensates containing subsequently etherified groups derived from alcohols. The urea-formaldehyde condensates are prepared by reacting formaldehyde with urea in the presence of an acid or alkaline medium so that a methylol urea is formed which is then heat cured to a cured resin per se. On the other hand, if an alcohol is not present during the initial acid condensation, an alcohol and acid can subsequently be added after the initial alkaline condensation. The latter procedure is suitable for alkylated urea-formaldehyde condensates derived from saturated $C_2$-$C_8$ aliphatic alcohols. Urea-formaldehyde condensates obtained from methyl or n-butyl alcohol are particularly suitable for impregnation or use in combination with other co-reactants. These alkylated urea-formaldehyde condensates are water-soluble and sometimes soluble in solvents such as hydrocarbons, ketones, esters and alcohols. Preparation of the condensates is not described herein since their preparation is adequately described in U.S. Pat. No. 2,222,506; 2,226,518; 2,227,223; 2,322,979; 2,323,357; 2,326,265 and 2,350,894.

The preparation of the triazine-aldehyde condensates is also well known. Any triazine having two or more amine groups can be reacted with any aldehyde, preferably in the presence of a mild alkaline catalyst, in an aqueous or non-aqueous media. Alkylated derivatives can be prepared by carrying out the reaction in a solvent (e.g., n-butanol). Suitable amino-triazines include melamine, ammeline, 2-chloro-4,6-diamino-1,3,5-triazine, 2,4-diamino-triazine, N,N-dimethyl-melamine, benzoguanamine, acetoguanamine and the like. Suitable aldehydes include paraformaldehyde, acetaldehyde, glyoxal, paraldehyde, benzaldehyde, furfural and the like. Suitable solvents can vary widely and include inert solvents, preferably easily volatized solvents such as toluene, xylene, benzene, and the like. As discussed above, solvents which react with the condensation product to form alkylated products can be used. Water can also be used as a solvent for some of the low molecular weight resins, which are sometimes referred to as cross-linking resins.

As with urea resins, the triazine-based amino resins can be the aldehyde-triazine reaction products or reaction products modified by reaction with an alcohol (e.g., methyl or butyl alcohol) in an acidic medium to form the corresponding ethers. The modified resins are also heat curable and somewhat more compatible with solvents and co-reactants. These resins can be made by those skilled in the art and many of them are commercially available from a number of sources.

All of the amino resins can be modified using typical amounts of conventional modifiers such as polyols, acetates, alkyd resins, and like resins. The modifiers add flexibility, vary surface appearance, and improve resistance to chemicals and weathering, as is well known in the art.

The curing of the amino resins is effected by admixing the resin with the above described adducts of an aromatic sulfonic acid and a bicyclic oxazolidine. The adduct can be used per se or it can be dissolved in a solvent such as an alcohol and/or water. Upon heating the mixture to the curing temperature, the adduct breaks down into the sulfonic acid and volatile amine. The sulfonic acid then catalyzes the curing reaction. The cure is especially rapid at temperatures below 116° C. (240° F.), e.g., about 10 minutes at 93° to 115° C.

It is preferred to use the latent catalyst in an amount sufficient to provide the cured amino resin with about 0.1 to about 5 wt. %, preferably about 1 wt. %, of the aromatic sulfonic acid based on the weight of binder solids. The resulting cured resins exhibit outstanding water resistance including the resistance to rusting. The cured resins are hard, tough, with excellent adhesion to substrates and excellent resistance to the deteriorating and destructive action of heat and chemicals, particularly alkalies. The cured resins are particularly useful as films and impregnants for materials which are repeatedly contacted with water and an alkali (e.g., soapy water). Thus, the present compositions can be used as surface coatings for washing machines and for heat-resistant, paper-based laminates (e.g., countertops).

Although not essential, it is generally preferred to mix the latent catalyst, the amino resin condensate, and co-reactants, if any, in water or a solvent. The urea and melamine condensates, as well as co-reactants such as glycols, polyethers, and alkyd resins, are soluble in a variety of solvents. Suitable solvents include ketones such as acetone, methyl ethyl ketone, methyl isobutyl ketone, isophorone, and the like; esters, such as ethyl acetate, butyl acetate, 2-ethoxyethanol acetate and the like; and ether alcohols, such as the methyl, ethyl or butyl ethers of ethylene glycol or diethylene glycol. Alcohols such as ethanol, isopropanol, n-butanol, and the like are also used by themselves in some cases. To save expenses, the most efficient, non-alcoholic solvents are ordinarily used in admixture with diluents which are themselves not universal solvents when used alone, but which may not be incorporated with active solvents. Reference is made in this respect to aromatic hydrocarbons, such as benzene, toluene, xylene, aromatic petroleum thinners and the like, as well as the alcohols discussed above. In order to achieve the desired evaporation and drying characteristics in coatings and impregnants, the solvents are combined and balanced in a manner well known in the lacquer, varnish and laminating arts. It is also often convenient to add the adduct as a solution in an organic solvent such as a glycol ether (e.g., 2-ethoxyethanol), an alcohol (e.g., ethanol, isopropanol, or n-butanol); a ketone (e.g., acetone or methyl ethyl ketone) as well as mixtures of two or more of such solvents. Isopropanol and methanol are especially convenient.

Desirable performance properties for amino resin coatings containing latent catalysts include low temperature cure, viscosity stability, and no tendency to produce wrinkling. Coatings containing preferred latent catalyst, i.e., p-toluene sulfonic acid/1-aza-3,7-dioxa-5-ethylbicyclo (3.3.0) octane, have good viscosity stability, which is better at 122% neutralization, and cures at low temperatures (e.g., 10 minutes at 100° C.) and when coated on substrates produce films with no wrinkles.

Conventionally, the amino resins and co-reactants, if any, may contain various other materials such as pigments, colorants, surfactants, fillers and the like. Pigments such as titanium dioxide, antimony oxide, lead oxide, carbon black, chrome yellow, zinc oxide, para red and the like can be used. Best results in preparing enamels are obtained by grinding the pigment with a portion of the solvent and amino resin and then adding the remainder of the solvent and co-reactant (e.g., a glycol, an alkyd resin, or a polyester resin). The enamel is ready for application after addition of the desired amount of the adduct.

When varnishes, lacquers or enamels containing the present composition are prepared, layers of suitable thickness of the film-forming material may be applied to metal, wood, or similar surfaces. Complete curing is attained because the conversion to an insoluble film is not dependent upon contact with air. This fact also makes the compositions valuable in the manufacture of laminates of cloth, paper, glass-cloth, and the like. Such laminae are impregnated with a solution of the amino resin, curing catalyst, and optional co-reactants. After drying, the impregnated sheets are stacked and cure is effected in a heated press.

Many of the catalyzed amino resin compositions are also suitable for molding operations wherein they are introduced into a mold, compressed, and heat cured. Various fillers, dyes and pigments may be incorporated in the molding compositions such as wood flour, talc, alpha-cellulose, zinc sulfide and the like. All such techniques are well known to those skilled in the art.

The following examples illustrate compositions within the scope of the present invention. They are not to be construed as being limiting in any manner. All parts are by weight. Surface properties were evaluated using the Tukon Hardness Test (ASTM test method No. D-1474), the Pencil Hardness Test [ASTM test method No. D-3383-75), the Double Methyl Ethyl Ketone Rubs Test (described below), the Crosshatch Test (ASTM test method No. D-3359), the Cleveland 72 Hour Humidity Test (ASTM test method No. D-2247-87), and the Salt Spray Test (150 hours) (ASTM test method No. B-117). The Double Methyl Ethyl Ketone Rubs Test, abbreviated MEK (2×), is carried out by saturating a cloth with methyl ethyl ketone and rubbing the film to be tested back and forth in double rub fashion until the film surface is noticeably attacked.

EXAMPLE 1

This example describes the preparation of a solution containing the preferred latent catalyst which is an adduct of p-toluene sulfonic acid and 1-aza-3,7-dioxa-5-ethylbicyclo (3.3.0) octane.

A total of 55.1 g. of methanol and 5.2 g. of water was charged to a suitable reaction vessel equipped with a stirrer and 22.5 g. of crystalline p-toluene sulfonic acid were added. The resulting mixture was stirred until it was clear and homogeneous. To this mixture was added slowly 17.2 g. of 1-aza-3,7-dioxa-5-ethylbicyclo (3.3.0) octane. After the addition the mixture was stirred for 15 minutes. The solution was approximately 20% active p-toluene sulfonic acid (p-TSA). The amount of amine used was sufficient to provide 100% theoretical neutralization of the acid.

EXAMPLE 2

This example describes the preparation of a solution containing one of the preferred latent catalysts which is an adduct of p-toluene sulfonic acid and the bicyclic oxazolidine 1-aza-3,7,dioxa-5-hydroxymethylbicyclo (3.3.0) octane.

A total of 46.6 g. of methanol and 13.9 g. of water is charged to a suitable reaction vessel equipped with a stirrer and 22.5 g. of crystalline p-toluene sulfonic acid is added. The resulting mixture is stirred until it is clear and homogeneous. To this mixture is added slowly 17.0 g. of 1-aza-3,7,dioxa-5-hydroxymethylbicyclo (3.3.0) octane. After the addition the mixture is stirred for 15 minutes. The solution should be approximately 20% active p-toluene sulfonic acid. The amount of amine used is sufficient to provide 100% theoretical neutralization of the acid.

EXAMPLE 3

This example describes the preparation of a solution containing one of the preferred latent catalysts which is an adduct of dodecyl benzene sulfonic acid and 1-aza-3,7-dioxa-5-ethylbicyclo (3.3.0) octane.

A total of 25.0 g. of dodecyl benzene sulfonic acid and 64.0 g. of isopropanol was charged to a suitable reaction vessel equipped with a stirrer and was mixed until the mixture was homogeneous. To this mixture was added slowly 11.0 g. of 1-aza-3,7-dioxa-5-ethylbicyclo (3.3.0) octane. After the addition the mixture was stirred for 15 minutes. The solution was approximately 25% active dodecyl benzene sulfonic acid. The amount of amine used was sufficient to provide 100% theoretical neutralization of the acid.

EXAMPLE 4

This example describes the preparation of a solution containing one of the preferred latent catalysts which is an adduct of dinonylnaphthalene monosulfonic acid and 1-aza-3,7-dioxa-5-ethylbicyclo (3.3.0) octane.

A total of 25.0 g. of 2-butoxy ethanol and 42.0 g. of isopropanol was charged to a suitable reaction vessel equipped with a stirrer and 25.0 g. of dinonylnaphthalene monosulfonic acid was added. To the resulting mixture was added slowly 8.0 g. of 1-aza-3,7,dioxa-5-ethylbicyclo (3.3.0) octane. After the addition the mixture was stirred for 15 minutes. The solution was approximately 25% active dinonylnaphthalene monosulfonic acid. The amount of amine used was sufficient to provide 100% theoretical neutralization of the acid.

EXAMPLE 5

This example describes the preparation of a solution containing the latent catalyst which is an adduct of dinonylnaphthalene disulfonic acid and 1-aza-3,7-dioxa-5-ethylbicyclo (3.3.0) octane.

A total of 20.5 g. of isobutanol, 35.0 g. of isopropanol and 6.2 g. of water was charged to a suitable reaction vessel equipped with a stirrer and 25.0 g. of dinonylnaphthalene disulfonic acid was added. The resulting mixture was mixed until it was homogeneous. To this mixture was added slowly 13.3 g. of 1-aza-3,7-dioxa-5-ethylbicyclo (3.3.0) octane. After the addition the mixture was stirred for 15 minutes. The solution was approximately 25% active dinonylnaphthalene disulfonic acid. The amount of amine used was sufficient to provide 100% theoretical neutralization of the acid.

EXAMPLE 6

This example describes the evaluation of the latent catalyst of Example 1, which is an adduct of p-toluene sulfonic acid and 1-aza-3,7-dioxa-5-ethylbicyclo (3.3.0) octane, in a curable amino resin.

The amino resin solution was prepared by solvating a butylated urea formaldehyde resin in a suitable solvent, e.g., butanol. Although a butylated urea formaldehyde resin was used for this example, other curable amino resins can be substituted with similar results. These include urea- or melamine-aldehyde condensation products or reaction products thereof with alcohols (e.g., methylol ureas or methylol melamines) and alkylated derivatives thereof (e.g., methylated or butylated derivatives).

A sufficient quantity of the catalyst solution of Example 1 was added to the amino resin solution to yield 0.5% p-toluene sulfonic acid based on total resin solids. The amino resin solution was then cast as a film on an iron phosphated steel panel to a wet film thickness of 4 mils using a doctor blade. The film was then heated in a forced draft oven for 10 minutes at 104° C. This cure cycle was sufficient to provide curing of the amino resin. The cured amino resin film was hard and tough, with excellent adhesion and excellent resistance to the destructive action of heat and chemicals.

EXAMPLE 7

This example describes the preparation and evaluation of a polyester coating containing the latent catalyst of Example 1 (designated A), p-toluene sulfonic acid (designated B), and other latent catalysts containing p-toluene sulfonic acid (designated C to E).

A. Preparation of Catalyst Solutions

The catalyst solutions were prepared by dissolving the following catalysts in the indicated solvent:

(A) p-toluenesulfonic acid/1-aza-3,7-dioxa-5-ethyl bicyclo (3.3.0) octane adduct of Example 1 in methanol/water (8% water);
(B) p-toluenesulfonic acid in isopropanol;
(C) p-toluenesulfonic acid/4,4-dimethyl-1-oxa-3-azacyclopentane adduct, one of the oxa-azacyclopentane adducts of U.S. Pat. No. 4,200,729, in isopropanol;
(D) p-toluenesulfonic acid/morpholine adduct in methanol/isopropanol (equal parts by weight); and
(E) p-toluenesulfonic acid/2-amino-2-ethyl-1,3-propanediol adduct in methanol/isopropanol (equal parts by weight).

The active solids content of the catalyst solution was 25% except for (A) where the solids were reduced to 20% to form a stable solution.

B. Preparation of Stock Polyester Solution

A stock polyester coating solution was prepared by combining 609.04 g. of high solids thermosetting, oil-free clear polyester resin having a hydroxyl number of about 150, a maximum acid number of 10 (on a solids basis), and a viscosity of 6000 to 14,000 cps. which is supplied at 85 wt. % solids in n-methoxy propyl acetate by Cargill Inc. as Polyester Resin 5776; 172.55 g. of a hexamethoxymethylmelamine crosslinking agent which is supplied in a liquid form at 98% plus non-volatile content by American Cyanamid under the trade name Cymel 303 or by the Monsanto Co. under the trade name Resimene 747; 135.93 g. of 2-methoxypropyl acetate; and 2.76 g. of leveling agent (DISLON ® 1980). Then 79.72 g. of 2-methoxypropyl acetate were added to adjust the viscosity. The resulting clear solution had a viscosity of 249 cps. at 25° C., a solids content of 69.3%, and a polyester/amino resin (HMMM) ratio of 75/25.

C. Preparation and Evaluation of Coatings

To the stock polyester solution was added, with stirring, sufficient quantities of the various catalyst solutions to yield 0.5% p-toluene sulfonic acid based on total resin solids. The various coating solutions are designated A to F to indicate the catalyst used. The coatings were then separately cast as films on iron phosphated steel panels using a doctor blade. The wet films (4 mils thick) were cured for 10 minutes at the indicated temperature in a BYK Gradient oven. The films were evaluated for Double MEK Rubs and Tukon Hardness. The results are shown in Tables 1 and 2.

TABLE 1

| | Double MEK Rubs | | | |
|---|---|---|---|---|
| Temp. (°C.) | SAMPLE A | SAMPLE B* | SAMPLE C* | SAMPLE E* |
| 93 | 14 | 24 | 5 | 11 |
| 104 | 25 | 34 | 15 | 23 |
| 116 | 51 | 70 | 35 | 50 |
| 127 | 100 | 100 | 100 | 100 |

*For comparative purposes

The results show that the adduct of the present invention exhibited faster cure response than the other amine-neutralized adducts as evidenced by the better solvent resistance of the cured films. Films cast using catalyst solution D (the p-toluene sulfonic acid/morpholine adduct) yellowed badly and were dropped from further evaluation as not being of any practical value.

TABLE 2

| | Tukon Hardness | | | |
|---|---|---|---|---|
| Temp. (°C.) | SAMPLE A | SAMPLE B* | SAMPLE C* | SAMPLE E* |
| 93 | 2.5 | 5.8 | 0 | 1.09 |
| 104 | 9.62 | 11.4 | 3.14 | 8.11 |
| 116 | 11.8 | 12.6 | 9.09 | 12.5 |
| 127 | 14.3 | 13.7 | 12.4 | 13.8 |

*For comparative purposes

The results show that the adduct of the present invention exhibited faster cure response than the other amine-neutralized adducts as shown by the higher film hardness of the cured film.

EXAMPLE 8

The viscosity stability at 50° C. of the various polyester coatings of Example 7 was evaluated. The results are shown in Table 3.

TABLE 3

| | Viscosity Stability (cps) | | | | |
|---|---|---|---|---|---|
| Hrs | Control | A | B* | C* | E* |
| 0 | 250 | 250 | 250 | 250 | 250 |
| 12 | — | — | 422 | — | — |
| 24 | — | 306 | — | 272 | 284 |
| 36 | 302 | — | 528 | — | — |
| 96 | — | 955 | — | 430 | 778 |
| 108 | 314 | — | 1450 | — | — |
| 120 | — | 1080 | — | 499 | 915 |
| 132 | 314 | — | 1580 | — | — |
| 288 | — | 1490 | — | 792 | 1370 |
| 300 | 296 | — | 2200 | — | — |
| 348 | — | 1700 | — | 1220 | 1800 |
| 360 | 326 | — | 2990 | — | — |
| 492 | — | 2590 | — | — | 2220 |
| 504 | 332 | — | 4830 | — | — |

Control is the polyester stock solution
*For comparative purposes

The results show that the adducts of the present invention exhibited better viscosity stability than the unblocked acid and only slightly less stability than the slower curing adduct (e.g., E). Further addition of the amine portion of the adduct will improve the viscosity stability without necessarily inhibiting the cure response (see Table 4 in Example 9).

EXAMPLE 9

A test was run to determine whether any of the catalysts promote wrinkling. Coatings were prepared by adding solutions of catalysts A to F to the polyester stock solution of Example 7 in amounts sufficient to provide 0.5% p-toluene sulfonic acid based on total resin solids. The coatings were drawn down on iron phosphated panels using a 6 mil wet applicator. The panels were immediately placed in gradient ovens with zone settings of 163° C., 177° C., 191° C. and 204° C. and cured for 10 minutes. None of the coated test panels showed any signs of wrinkling. Catalyst E, the p-toluene sulfonic acid/morpholine adduct, did cause severe yellowing of the cured film at the higher temperatures.

EXAMPLE 10

The polyester stock coating solution of Example 7 was catalyzed with solutions of p-toluene sulfonic acid/1-aza-3,7-dioxa-5-ethylbicyclo (3.3.0) octane adduct from Example 1 which were neutralized to 100% and neutralized to 122%. These polyester coatings are designated A-100% and A-122%. They were evaluated as in Example 7. The results are shown in Table 4 together with the results for a polyester coating containing the solution of catalyst B from Example 7.

TABLE 4

| | Double MEK Rubs and Tukon Hardness | | | | | |
|---|---|---|---|---|---|---|
| | A - 100% | | A - 122% | | B* | |
| Temp °C. | MEK (2×) | Tukon | MEK (2×) | Tukon | MEK (2×) | Tukon |
| 93 | 17 | 1.54 | 13 | 1.32 | 45 | 8.18 |
| 104 | 31 | 10.40 | 34 | 8.60 | 77 | 10.40 |
| 116 | 90 | 13.00 | 79 | 11.20 | 100 | 11.00 |
| 127 | 100 | 13.20 | 100 | 11.90 | 100 | 11.40 |

*For comparative purposes

The results show that the addition of excess bicyclic oxazolidine did not materially affect the cure response.

EXAMPLE 11

The viscosity stability at 50° C. of the polyester coatings of Example 10 was evaluated. The results are shown in Table 5.

TABLE 5

| | Viscosity Stability at 50° C. (cps) | | | |
|---|---|---|---|---|
| Hours | Control | A-100% | A-122% | SAMPLE B* |
| 0 | 259 | 214 | 219 | 239 |
| 72 | 286 | 698 | 678 | 1270 |
| 96 | 294 | 700 | 728 | 1290 |
| 168 | 286 | 902 | 808 | 1520 |
| 264 | 311 | 1120 | 985 | 1840 |
| 648 | 340 | 1430 | 1190 | 3040 |

Stock solution is used as the control.
*For comparative purposes

The results show that the addition of excess bicyclic oxazolidine improved the viscosity stability.

EXAMPLE 12

This example describes the preparation and evaluation of polyester coatings containing the latent catalyst of Example 3 (designated F) and another latent catalyst (designated G) which is an adduct of dodecylbenzene sulfonic acid and one of the oxa-azacyclopentane adducts of U.S. Pat. No. 4,200,729.

A. Preparation of Catalyst Solutions

The catalyst solutions were prepared by dissolving the following catalysts in the indicated solvent system:
(F) Dodecylbenzene sulfonic acid/1-aza-3,7-dioxa-5-ethyl bicyclo (3.3.0) octane adduct of Example 3 in isopropanol;
(G) Dodecylbenzene sulfonic acid/4,4-dimethyl-1-oxa-3-aza-cyclopentane adduct of '729 patent in isopropanol.
The active solids content of both catalyst solutions was 25%.

B. Preparation and Evaluation of Coatings

To the stock polyester solution of Example 7 was added, with stirring, sufficient quantities of the two catalyst solutions to yield 0.5% dodecyl benzene sulfonic acid based on total resin solids. The two coating solutions are designated F and G to indicate the catalyst used. The coatings were separately cast as films on zinc phosphated steel panels using a doctor blade. The wet films (4 mils thick) were cured for 10 minutes at the indicated temperature in a Byk Gradient oven. The films were evaluated for Tukon Hardness and Pencil Hardness. The results are shown in Table 6.

TABLE 6

| | F | | G* | |
|---|---|---|---|---|
| Temp (°C.) | Tukon | Pencil Hardness | Tukon | Pencil Hardness |
| 107 | 1.7 | F-H2 | 0.5 | HB-F |
| 121 | 15.0 | 2-3H | 11.7 | 2-3H |

*For comparative purposes

The results show that the adduct of the present invention exhibited faster cure response than the other amine neutralized adduct as evidenced by the higher film hardness of the cured film.

EXAMPLE 13

This example described the preparation and evaluation of a polyarylic coating containing the latent catalyst of Example 1 (designated A), p-toluene sulfonic acid (designated B), and other latent catalysts containing p-toluene sulfonic acid (designated C and E).

A. Preparation of Catalyst Solutions

Preparation of the catalyst solutions is described in Example 7.

B. Preparation of Polyacrylic Stock Solution

A stock acrylic solution was prepared by combining 608.69 g. of a high solids, thermosetting, clear acrylic resin having a hydroxyl number of 86, and acid number of 28 (on a solids basis), and a viscosity of 5000 to 9000 cps. which is supplied at 75% wt. % solids in methyl amyl ketone by Rohm & Haas as Acryloid AT 400; 152.17 G. of the amino resin crosslinking agent (Cymel 303) described in Example 7; 119.57 g. of 2-methoxypropyl acetate; and 119.57 g. of methyl isobutyl ketone. The resulting clear solution had a viscosity of 242 cps. at 25° C., a solids content of 60.9%, and an acrylic-/amino resin (HMMM) ratio of 75/25.

C. Preparation and Evaluation of Coatings

Using the catalyst solutions and procedures described in Example 7, acrylic coatings were prepared and evaluated. The Double MEK Rubs and Tukon Hardness test results ar shown in Tables 7 and 8.

TABLE 7

| | Double MEK Rubs | | | |
|---|---|---|---|---|
| Temp. (°C.) | SAMPLE A | SAMPLE B* | SAMPLE C* | SAMPLE E* |
| 93 | 38 | 45 | 12 | 25 |
| 104 | 87 | 77 | 21 | 70 |
| 116 | 100 | 100 | 94 | 100 |
| 127 | 100 | 100 | 100 | 100 |

*For comparative purposes

The results show that the adduct of the present invention exhibited faster cure response than the other amine-neutralized adducts as shown by the higher film hardness of the cured film.

TABLE 8

| | Tukon Hardness | | | |
|---|---|---|---|---|
| Temp. (°C.) | SAMPLE A | SAMPLE B* | SAMPLE C* | SAMPLE E* |
| 93 | 6.37 | 8.18 | 2.32 | 5.14 |

TABLE 8-continued

| Temp. (°C.) | Tukon Hardness | | | |
|---|---|---|---|---|
| | SAMPLE A | SAMPLE B* | SAMPLE C* | SAMPLE E* |
| 104 | 9.39 | 10.4 | 6.09 | 9.44 |
| 116 | 10.5 | 11.0 | 9.00 | 10.9 |
| 127 | 11.2 | 11.4 | 10.1 | 11.2 |

*For comparative purposes

The results shown that the adduct of the present invention exhibited faster cure response than the other amine-neutralized adducts as shown by the higher film hardness of the cured film.

EXAMPLE 14

This example describes the evaluation of the catalyst of Example 1 (catalyst A) at 100% and 122% neutralization in another acrylic coating and compares the test results obtained with these coatings (designated A-100% and A-122%) with the test results obtained with coatings containing catalyst C of Example 7 and the additional latent catalysts (designated H and I) described below.

A. Preparation of Catalyst Solutions

The catalyst solutions were prepared by dissolving the following catalysts in the indicated solvent:

A-100%: p-toluene sulfonic acid/1-aza-3,7-dioxa-5-ethylbicyclo (3.3.0) octane of Example 1 neutralized with 100% amine and dissolved in methanol/water;

A-122%: p-toluene sulfonic acid/1-aza-3,7-dioxa-5-ethylbicyclo (3.3.0) octane of Example 1 neutralized with 122% amine and dissolved in methanol/water;

C—p-toluene sulfonic acid/4,4-dimethyl-1-oxa-3-azacyclopentanol adduct (of Example 7) dissolved in isopropanol;

H—p-toluenesulfonic acid/triethylamine adduct dissolved in isopropanol;

I—p-toluenesulfonic acid/morpholine adduct dissolved in 2-butoxy ethanol.

The active acid content for each catalyst is 20% for A-100% and A-122%; 25% for C; 25% for H; 18.5% for I.

B. Preparation of Acrylic Stock Solution

An acrylic stock solution was prepared by combining 58.33 g. of a high solids, thermosetting, clear acrylic resin having a hydroxyl number of 155, an acid number of 5 (on a solids basis), and a viscosity of 6000 to 10,000 cps. which is supplied at 84 wt. % solids in n-butyl acetate by Rohm & Haas as Acryloid QR 1120; 21.00 g. of the amino resin crosslinking agent (Cymel 303) described in Example 7; and 20.67 g. of a 1:1 mixture (by weight) of xylene and methyl ethyl ketone. The resulting solution had an acrylic to amino resin ratio of 70/30, and a total resin solid of 70%.

C. Preparation and Evaluation of Coatings

Polyacrylic coatings were prepared by adding the solutions of catalysts A-100%, A-122%, C, H, and I to the stock solutions in amounts sufficient to provide 0.5% p-toluene sulfonic acid based on total resin solids. Films were cast from the acrylic coating at 0.9-1.0 wet mil on iron phosphated steel panels. The films were tested for Tukon Hardness and Double MEK Rubs.

The results are shown in Table 9. Coating H was not evaluated because the film was wrinkled.

TABLE 9

| Temp. (°C.) | | A-100% | A-122% | C* | I* |
|---|---|---|---|---|---|
| 93 | Tukon | 6.98 | 7.92 | 4.01 | 4.19 |
| | MEK (2×) | 75 | 100 mar | 38 | 70 |
| 104 | Tukon | 10.1 | 9.55 | 7.46 | 7.37 |
| | MEK (2×) | 100 | 100 | 78 | 84 |
| 116 | Tukon | 11.9 | 11.7 | 10.3 | 10.2 |
| | MEK (2×) | 100 | 100 | 100 | 100 |
| 127 | Tukon | 13.1 | 12.5 | 12.5 | 12.5 |
| | MEK (2×) | 100 | 100 | 100 | 100 |

*For comparative purposes

The coatings were then separately cast at 0.90-1.0 wet mil on iron phosphated steel panels and cured for 15 minutes at 127° (260° F.). The films were tested for Pencil Hardness, Tukon KNH25 Hardness, Double MEK rubs, Crosshatch (% loss), Cleveland Humidity (72 hrs), and Salt Spray. The results are shown in Table 10.

TABLE 10

| Test | A-100% | A-122% | C* | I* |
|---|---|---|---|---|
| Pencil Hardness | H-2H | H-2H | H-2H | H-2H |
| Tukon KNH25 | 13.8 | 12.7 | 13.9 | 12.9 |
| MEK (2×) Rub | 100 | 100 | 99 | 100 mar |
| Crosshatch (% loss) | 0 | 0 | 0 | 0 |
| Cleveland Humidity (72 hrs) | 6FM | 6M | 6MD | 6D |
| Salt Spray (150 hrs) | 2F/5mm | 2F/5mm | 3F/5mm | 4F/6mm |

*For comparative purposes.

In the above table the abbreviations F, M, D, MD, FM means few, medium, dense, medium dense, and few medium. Blister rating is mm. creepage from the scribe line (ASTM test method No. D-714-8).

The results show improvement in cure response, humidity resistance, and salt spray (i.e., corrosion, resistance).

EXAMPLE 15

The viscosity stability of the polyacrylic coating of Example 14 was tested at 50° C. The sample neutralized at 122% was more stable than the sample neutralized at 100%.

EXAMPLE 16

This example describes the evaluation of the catalyst of Example 1 (Catalyst A) at 100% and 122% neutralization in a polyester coating and compares the test results obtained with these coatings (designated A-100% and A-122%) with the test results obtained with coatings containing Catalyst C of Example 7.

A. Preparation of Polyester Stock Solution

A stock polyester coating solution was prepared by combining 60.9 g. of a high solids, thermosetting, oil-free clear polyester resin having a hydroxyl number of about 150, a maximum acid number of 10 (on a solids basis), and a viscosity of 6000 to 14,000 cps. which is supplied at 85 wt. % solids in n-methoxy propyl acetate by Cargill Inc. as Polyester Resin 5776; 17.3 g. of the amino resin crosslinking agent (Cymel 303) described in Example 7; 21.5 g. of 2-methoxypropyl acetate; and 0.3 g. of flow and leveling agent (Dislon ® L-1980). The resulting clear solution had a polyester to amino resin ratio of 80/20 and a total resin solids of 69%.

B. Preparation and Evaluation of The Coating

To the stock polyester solution was added, with stirring, sufficient quantities of the catalyst solutions A-100%, A-122%, and C to yield 0.5% p-toluene sulfonic acid based on total resin solids.

Films were cast from the polyester coatings at 0.9–1.0 wet mil on iron phosphated steel panels and cured for 10 minutes at the indicated temperature. The films were tested for Tukon Hardness and Double MEK Rubs.

The results are shown in Table 11.

TABLE 11

| Temp. °C. | | A-100% | A-122% | C* |
|---|---|---|---|---|
| 93 | Tukon | 7.18 | 8.27 | 4.45 |
|  | MEK (2×) | 31 | 34 | 22 |
| 104 | Tukon | 13.0 | 13.2 | 12.5 |
|  | MEK (2×) | 78 | 98 | 66 |
| 116 | Tukon | 13.5 | 13.8 | 13.4 |
|  | MEK (2×) | 100 | 100 | 100 MAR |
| 129 | Tukon | 14.2 | 14.3 | 15.0 |
|  | MEK (2×) | 100 | 100 | 100 |

The results show that the adduct of the present invention exhibited faster cure response than the other amine-neutralized adducts as shown by the higher film hardness of the cured film.

The polyester coatings were also evaluated for their viscosity stability at 50° C. The results are shown in Table 12.

TABLE 12

| | Viscosity Stability at (cps) 50° C. | | |
|---|---|---|---|
| Time (hrs) | A-100% | A-122% | C* |
| 0 | 270 | 270 | 270 |
| 24 | 422 | 458 | 274 |
| 48 | 708 | 762 | 421 |
| 120 | 875 | 914 | 574 |
| 192 | 964 | 930 | 696 |
| 285 | 1090 | 1080 | 927 |

*For comparative purposes

The results show that the long term viscosity stability of the sample neutralized to 122% was not significantly greater than that of the sample neutralized to 100% and that the 100% and 122% neutralized samples were somewhat less stable than sample C (i.e., the p-toluene sulfonic acid/4,4-dimethyl-1-oxa-3-aza-cyclopentane adduct).

All obvious modification and variations which will suggest themselves to those skilled in the art in the light of the above detailed description are included within the scope of the present invention.

What is claimed is:

1. A thermally-decomposable composition comprising a bicyclic oxazolidine adduct of an aromatic sulfonic acid, the adduct having the formula:

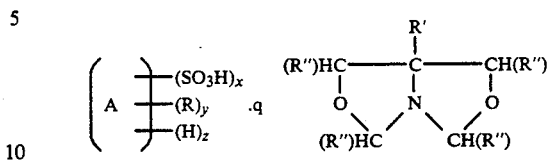

wherein A is phenyl or naphthyl; x is 1 to 8; y is 0 to 7; the sum of x and y is no greater than 8; z is 8−x−y when A is naphthyl and z is 6−x−y when A is phenyl; q is equal to or greater than about 0.5; R is an alkyl, halogen, haloalkyl, or alkoxy group; R' is an organic group; and R" is hydrogen or a $C_1$-$C_6$ alkyl group.

2. The composition of claim 1, wherein R is an alkyl or alkoxy group; R' is an alkyl or hydroxy alkyl group; and R" is hydrogen.

3. The composition of claim 2, wherein R is an alkyl group and R' is an ethyl group.

4. The composition of claim 1, wherein R is an alkyl group and R' is a hydroxy methyl group.

5. The composition of claim 1, wherein the aromatic sulfonic acid is an alkyl-benzene sulfonic acid or an alkyl-naphthalene sulfonic acid.

6. The composition of claim 5, wherein the alkyl-benzene sulfonic acid is para-toluene sulfonic acid or dodecylbenzene sulfonic acid and wherein the alkylnaphthalene sulfonic acid is dinonylnaphthalene sulfonic acid or dinonylnaphthalene disulfonic acid.

7. The composition of claim 1, wherein the bicyclic oxazolidine is 1-aza-3,7-dioxa-5-ethylbicyclo (3.3.0) octane.

8. The composition of claim 1, wherein the aromatic sulfonic acid is p-toluene sulfonic acid and the bicyclic oxazolidine is 1-aza-3,7-dioxa-5-ethylbicyclo (3.3.0) octane.

9. A composition comprising a curable amino resin and a catalytically effective amount of a thermally-decomposable adduct of an aromatic sulfonic acid and a bicyclic oxazolidine adduct having the general formula:

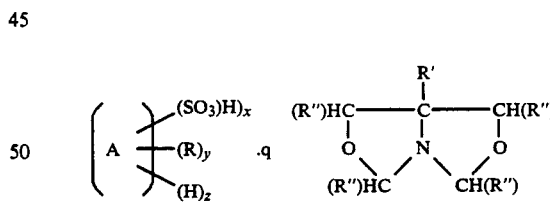

wherein A is phenyl or naphthyl; x is 1 to 8; y is 0 to 7; the sum of x and y is no greater than 8; z is 8−x−y when A is naphthyl and z is 6−x−y when A is phenyl; q is equal to or greater than about 0.5; R is an alkyl, halogen, haloalkyl, or alkoxy group; R' is an organic radical; and R" is hydrogen or a $C_1$-$C_6$ alkyl group.

10. The composition of claim 9, wherein R is an alkyl or alkoxy group; R' is an alkyl or hydroxy alkyl group; and R" is hydrogen.

11. The composition of claim 10, wherein R is an alkyl group and R' is an ethyl group or hydroxy methyl group.

12. The composition of claim 9, wherein the aromatic sulfonic acid is an alkyl-benzene sulfonic acid or an alkyl-naphthalene sulfonic acid.

13. The composition of claim 9, wherein the aromatic sulfonic is p-toluene sulfonic acid, dodecylbenzene sulfonic acid, dinonylnaphthalene sulfonic acid, or dinonylnaphthalene disulfonic acid.

14. The composition of claim 9, wherein the bicyclic oxazolidine is 1-aza-3,7-dioxa-5-ethylbicyclo (3.3.0) octane.

15. The composition of claim 14, wherein the aromatic sulfonic acid is p-toluene sulfonic acid.

16. The composition of claim 9, wherein the amino resin is a urea condensate, a melamine condensate, a benzoguanamine condensate, or an acetoguanamine condensate.

17. The composition of claim 16, wherein the condensate is dissolved in water and/or a solvent.

18. The composition of claim 9, wherein the amino resin is modified with an alcohol.

19. The composition of claim 9, further comprising a polyfunctional co-reactant capable of combining with the amino resin during heat curing.

20. The composition of claim 16, further comprising a polyfunctional co-reactant capable of combining with the amino resin during heat curing.

21. The composition of claim 19, wherein the co-reactant contains hydroxyl, carboxyl, or amide groups or a combination thereof.

22. The composition of claim 20, wherein the co-reactant is a polyacrylic resin or a polyester resin.

23. The composition of claim 22, wherein the co-reactant is the polyester resin.

24. The composition of claim 22, wherein the co-reactant is the polyacrylic resin.

25. A three-dimensional substrate, the surface of which has a coating thereover comprising a reaction product of the components of the composition of claim 9.

26. A three-dimensional substrate, the surface of which has a coating thereover comprising a reaction product of the components of claim 15.

27. A three-dimensional substrate, the surface of which has a coating thereover comprising a reaction product of the components of claim 22.

* * * * *